(12) United States Patent
Inoue et al.

(10) Patent No.: US 7,536,532 B2
(45) Date of Patent: May 19, 2009

(54) MERGE OPERATIONS OF DATA ARRAYS BASED ON SIMD INSTRUCTIONS

(75) Inventors: Hiroshi Inoue, Yokohama (JP); Moriyoshi Ohara, Yokohama (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 11/535,840

(22) Filed: Sep. 27, 2006

(65) Prior Publication Data

US 2008/0077768 A1  Mar. 27, 2008

(51) Int. Cl.
*G06F 15/80*  (2006.01)

(52) U.S. Cl. .......................................................... 712/22
(58) Field of Classification Search ................. 712/2, 712/4, 22, 222, 300; 345/629, 630, 631
See application file for complete search history.

(56) References Cited

U.S. PATENT DOCUMENTS 5,086,408 A * 2/1992 Sakata ........................ 707/200
5,091,848 A * 2/1992 Kojima ........................... 712/8
2003/0221089 A1* 11/2003 Spracklen .................... 712/221
2004/0054877 A1* 3/2004 Macy et al. .................. 712/221
2005/0038910 A1* 2/2005 Zbiciak ........................ 709/246

OTHER PUBLICATIONS

Intel, "IA-64 Application Developer's Architecture Guide," May 1999, pp. 7-130, 131, 132, 145, 146, 147, 148.*
Hewlett-Packard, "PA-RISC 2.0," 1995, pp. 7-108, 109.*
Wang et al., "Standardized Parallel Sorting on SIMD Array Processor", 1993, pp. 704-707.*

* cited by examiner

*Primary Examiner*—David J Huisman
(74) *Attorney, Agent, or Firm*—Lieberman & Brandsdorfer, LLC

(57) ABSTRACT

A method and apparatus are provided to perform efficient merging operations of two or more streams of data by using SIMD instruction. Streams of data are merged together in parallel and with mitigated or removed conditional branching. The merge operations of the streams of data include Merge AND and Merge OR operations.

7 Claims, 4 Drawing Sheets

MERGE OPERATIONS OF DATA ARRAYS BASED ON SIMD INSTRUCTIONS

BACKGROUND OF THE INVENTION

1. Technical Field

This invention relates to merge operations using VMX instructions in an SIMD processor. More particularly, the invention pertains to an improved efficiency in merging two or more streams of data.

2. Description of the Prior Art

SIMD (Single Instruction, Multiple Data) is a technique employed to achieve data level parallelism in a computing environment. This technique is commonly applied to a vector or array processor in which a processor is able to run mathematical operations on multiple data elements simultaneously. In the past there were a number of dedicated processors for this sort of task, commonly referred to as digital signal processors (DSPs). The main difference between SIMD and a DSP is that the latter were complete processors with their own instruction set, whereas SIMD designs rely on the general-purpose portions of the central processing unit to handle the program details. The SIMD instructions handle the data manipulation only. In addition, DSP's also tend to include instructions to handle specific types of data, sound or video, whereas SIMD systems are considerably more general purpose.

An application that may take advantage of SIMD is one where the same value is being added to or subtracted from a large number of data points, a common operation in many multimedia applications. With a SIMD processor, data is understood to be in blocks, and a number of values can be loaded all at once. In addition, a SIMD processor will have a single instruction that effectively manipulates all of the data points. Another advantage is that SIMD systems typically include only those instructions that can be applied to all of the data in one operation. In other words, if the SIMD system works by loading up eight data points at once, the mathematical operation being applied to the data will happen to all eight values at the same time. Although the same is true for any superscalar processor design, the level of parallelism in a SIMD system is typically much higher.

Merge operations are known in the art as operations which merge two or more sorted data streams into a single data stream. The following is sample code illustrating an algorithm of a basic merge operation that merges content of array A with content of array B to an output stream identified as array C:

```
While ((Apos < Acount) &&(Bpos < Bcount)) {
    If (A[Apos] > B[Bpos]) {            // A > B
        C[Cpos++] = B[Bpos++];
    } else {                            // A < B
        C[Cpos++] = A[Apos++];
    }
}
```

Among operations based on the merge operation employed for information retrieval are Merge AND and Merge OR. The Merge AND operation outputs data to an output stream only when the same values are included in both input streams. The following is sample code for a Merge AND operation performed without SIMD instructions:

```
While ((Apos < Acount) &&(Bpos < Bcount)) {
    If (A[Apos] > B[Bpos]) {            // A > B
        Bpos++;
    } else if (A[Apos] < B[Bpos]) {     // A < B
        Apos++;
    } else {                            // A = B
        C[Cpos++] = A[Apos++];
        Bpos++;
    }
}
```

The Merge OR operation outputs unique data values from both input stream to an output stream. Duplicated data are omitted. The following is sample code for a Merge OR operation performed without SIMD instructions:

```
While ((Apos < Acount) &&(Bpos < Bcount)) {
    If (A[Apos] > B[Bpos]) {            // A > B
        C[Cpos++] = B[Bpos++];
    } else if (A[Apos] < B[Bpos]) {     // A < B
        C[Cpos++] = A[Apos++];
    } else {                            // A = B
        C[Cpos++] = A[Apos++];
        Bpos++;
    }
}
```

As illustrated above, both the Merge AND operation and the Merge OR operation without SIMD instructions include conditional branch instructions for each operation of an element. A conditional branch is a basic logical structure that resembles a fork in the road where there are at least two paths that may be selected, but only one is chosen. The following is an example of a conditional branch: if a certain condition exits, then the application will perform one action, whereas if the condition does not exist, the application will perform another action. The conditional branches of the prior art Merge AND and Merge OR operations are taken in an arbitrary order with roughly a fifty percent probability for random input data.

It is difficult for branch prediction hardware to predict branches. Therefore, there is a need for a solution that employs the Merge AND and/or Merge OR operations that reduces the number of conditional branch instructions.

SUMMARY OF THE INVENTION

This invention comprises a method and computer readable instructions for efficiently merging two or more streams of data.

In one aspect of the invention, a method is provided for performing high speed merge operations of two or more data arrays. A plurality of data from a first input stream is loaded into a first set of vector registers and a plurality of data from a second input stream is loaded into a second set of vector registers. A vector permute instruction is invoked to generate first and second summary data streams. The first summary stream is associated with data from the first input stream, and the second summary stream is associated with data from the second input stream. A vector compare instruction is invoked to compare the first summary stream with the second summary stream. An input value from the compared data is placed into a single output stream if there is at least one matching pair from the vector compare instruction.

In another aspect of the invention, a method is provided for performing high speed merge operations of two or more data arrays. A plurality of data from a first input stream is loaded into a first set of vector registers and a plurality of data from a second input stream is loaded into a second set of vector registers. A vector minimum instruction, a vector maximum instruction, and a vector permute instruction are invoked in a repeated manner to merge data loaded into the vector register. Contents from the vector register that contains the smaller values are placed into a single output stream, and a pointer is advanced to denote a position of the next data to be read.

In yet another aspect of the invention, a computer system is provided with a SIMD processor configured to employ SIMD instructions to perform high speed merge operations of two or more data arrays. Data is loaded from a first input stream into a first set of vector registers, and data is loaded from a second input stream into a second set of vector registers. Thereafter, a permute instruction generates first and second summary data streams, with the first summary stream associated with data from the first input stream and the second summary stream associated with data from the second input stream. A vector instruction is invoked to compare the first summary stream with the second summary stream. Compared data is placed in a single output stream when there is at least one match pair in a result of the vector compare instruction.

Other features and advantages of this invention will become apparent from the following detailed description of the presently preferred embodiment of the invention, taken in conjunction with the accompanying drawings.

DESCRIPTION OF THE PREFERRED EMBODIMENT

Technical Details

Figure 1:
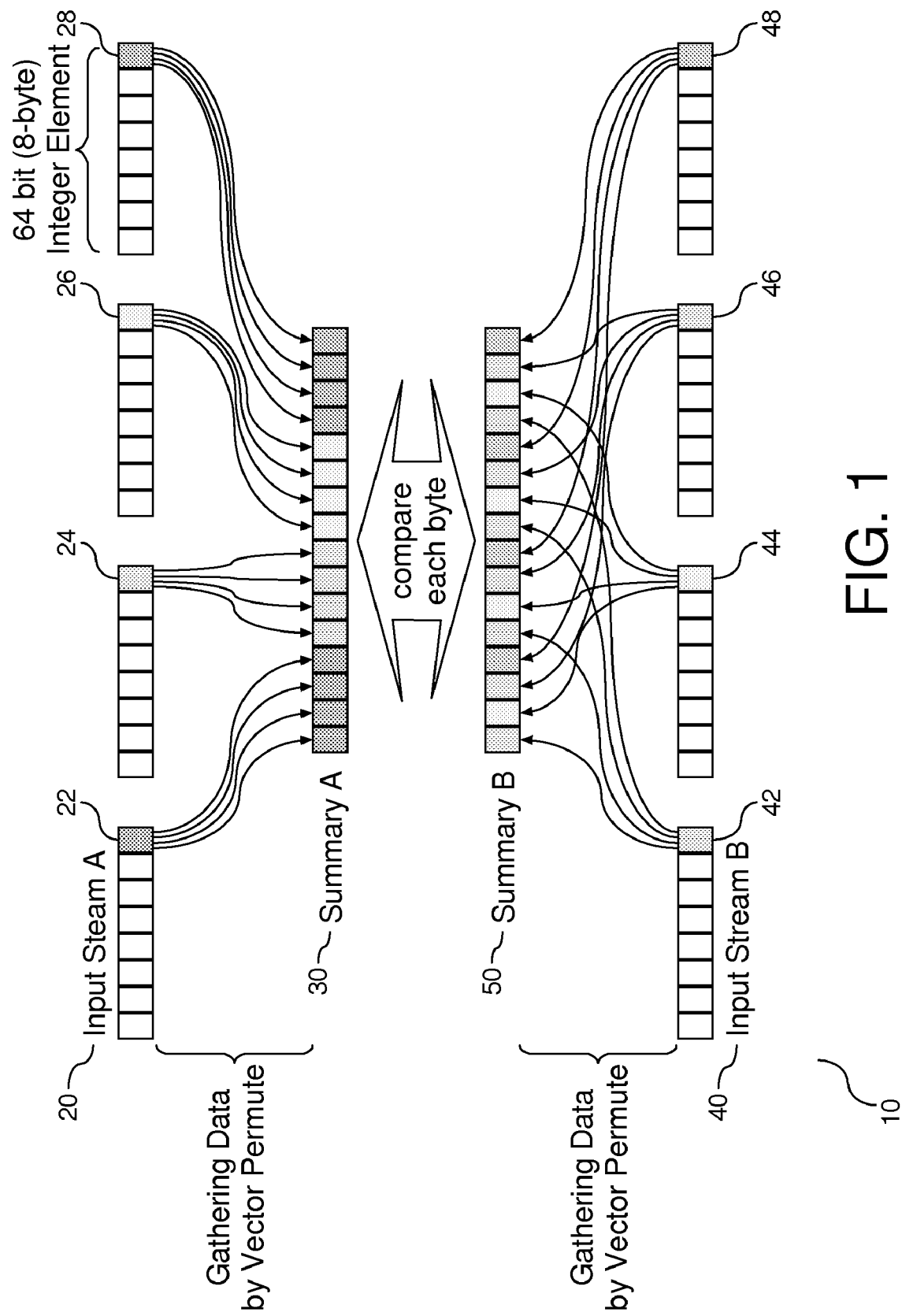
FIG. 1 is a block diagram showing a vector comparison of every four elements in a merge AND operation using the VMX instructions

An instruction set, or instruction set architecture (ISA), describes the aspects of a computer architecture visible to a programmer, including the native data types, instructions, registers, addressing modes, memory architecture, interrupt and exception handling, and external I/O (if any). The ISA is a specification of the set of all binary codes that are the native form of commands implemented by a particular CPU design. The set of binary codes for a particular ISA is also known as the machine language for that ISA.

VMX is a floating point and integer SIMD instruction set implemented on versions of a reduced instruction set microprocessor architecture. It features 128-bit vector registers that can represent sixteen 8-bit signed or unsigned characters, eight 16-bit signed or unsigned shorts, four 32-bit integers or four 32-bit floating point variables. VMX provides cache-control instructions intended to minimize cache pollution when working on streams of data. SIMD instruction sets can batch process a plurality of data sets that are consecutive in memory.

In one embodiment, data is merged using a VMX instruction set. The following instructions sets in VMX are utilized with the merge operations: vector minimum, vector maximum, vector compare equal, and vector permutation. The vector minimum instruction compares each value of the elements in a first input register to the corresponding value in a second input register, and places the smaller of the two values into a corresponding element of the output register. Similarly, the vector maximum instruction compares each value of the elements in a first input register to the corresponding value in a second input register, and places the larger of the two values into a corresponding element of the output register. The vector compare equal instruction compares each value in a first input register to a corresponding value in a second input register, and sets each of the bits of the corresponding element of the output register to 1 if the elements of the two input registers are the same. Conversely, if the elements of the two input registers are not the same, each of the bits of the corresponding element(s) of the output register are set to 0, i.e. the bits of the output register are cleared. The vector permutation employs two input registers and a single output register. The vector permutation instruction handles data in the registers as 16 single byte strings. The instruction first creates 32 single byte strings by combining the first argument with a second argument, in that order, and returns a byte value of the position indicated by the values of the lowest 5 bits in each element of the third argument as the return value of the position corresponding to that element.

With the Merge AND operation, the number of output data becomes smaller than that of the input data because data output is limited only to data from the input streams that have the same value. Similarly, with the Merge OR operation, the number of output data remains about the same as the input data because data output is limited to unique data from the input streams.

The following is an example of pseudo code for a Merge AND operation for two arrays whose elements are a 64 bit integer, using VMX instructions:

1. Load four 64 bit integer values at a time from two input streams.
2. Gather one byte at the least significant byte of each data using the vector permutation instruction to make a summary A vector and a summary B vector.
3. Compare the summary A vector with the summary B vector using a vector compare equal instruction as a pair of 16 sets of one-byte data. When there is no pair to correspond between the summary A and summary B vectors proceed to step 10.
4. Gather the data of the second byte from the last byte of each integer value by using the vector permutation instruction into the summary A vector and summary B vector, respectively.
5. Compare the summary A vector and summary B vector with the vector compare equal instruction as a pair of 16 sets of one-byte data. When there is no pair to correspond between the summary A and summary B vectors proceed to step 10.
6. Generate a bitmask which shows the results of comparison in steps 3 or 5. Each bit of this bitmask represents the result of the comparison of each pair.
7. Against the bitmask, obtain the position where a bit is first set by using a count leading zero instruction.
8. Compare the pair of integer values corresponding to the position obtained at step 7, and when they have the same value, output the value. Regardless of whether the value is sent to an output register, set the corresponding bit in the bitmask to 0.

9. Return to step 7 when all bits of the bitmask are not 0.
10. Advance the pointer that denotes the position to read next element in the array and proceed to the next data block, and return to step 1. After the operation of all data is completed end.

Although the above pseudo code is shown for a 64 bit integer data type, the Merge AND operation is not limited to this data type. In one embodiment, other data types may be employed, and as such, the invention is not limited to the integer data type shown herein.

FIG. 1 is a block diagram (10) showing a vector comparison of every four elements in a Merge AND operation using the VMX instructions outlined above. As shown, there are two input streams, a first input stream A (20) and a second input stream B (40). Data in each of the two input streams (20) and (40) is divided into 64 bit integer elements, and part of the data of each input stream is gathered (22), (24), (26), and (28), and (42), (44), (46), and (48) using a vector permute instruction. In one embodiment, the least significant byte is selected from each integer element. The gathered data forms two summary data vectors, summary A (30) from the first input stream (20) and summary B (50) from the second input stream (40). The summary data vectors (30) and (50) are then compared using a vector compare instruction. In many comparison cases employing VMX instructions, there are no corresponding pairs. Therefore, when employing VMX instructions in a vector comparison multiple elements can be terminated with a single comparison, thereby mitigating branch mis-prediction of any conditional branches.

Figure 2:
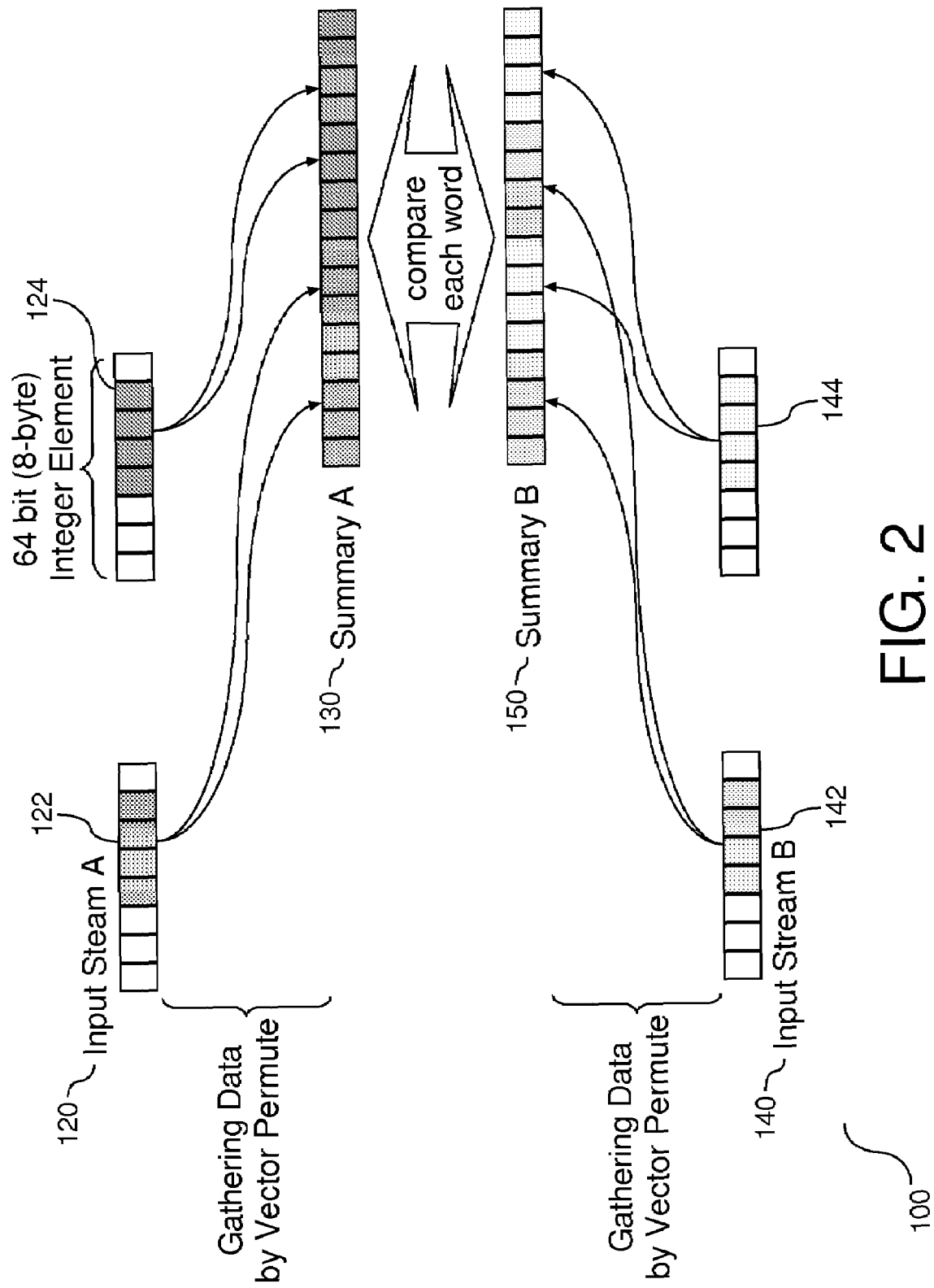
FIG. 2 is a block diagram showing a vector comparison of every two elements in a merge AND operation using VMX instructions.

FIG. 2 is a block diagram (100) showing a vector comparison of every two elements in a Merge AND operation. As shown, there are two input streams, a first input stream A (120) and a second input stream B (140). In one embodiment, data in each of the two input streams (120) and (140) is divided into 64 bit integer elements. Part of the data of each input stream is gathered (122) and (124), and (142) and (144), respectively, using a vector permute instruction. The gathered data forms two summary data vectors, summary A (130) from the first input stream (120) and summary B (150) from the second input stream (140). The summary data vectors (130) and (150) are then compared using a vector compare instruction. Two elements are compared at a time. By performing the comparison using the VMX instructions, the number of comparisons is reduced.

In the Merge OR operation, the output stream size is almost the same as that of the input stream. Therefore, the goal in improving efficiency in the Merge OR operation is to employ parallel comparison instruction(s) to reduce the number of conditional branches. The following is pseudo code for the Merge OR operation for two arrays whose elements are a 32 bit integer:

1. Read every four 32 bit integer values at a time from both input stream into vector registers vMin and vMax.
2. Perform the merge operation against the integer values in the vMin and vMax to store four smaller data in the vMin and four larger data in vMax.
3. Output the content of the vMin as a result of the merge operation. If the values are the same when comparing the proximate output value, nothing is output.
4. Compare values of the next element of both input streams to load four elements from the smaller stream to the vector register vMin, and advance the pointer corresponding to the stream.
5. If the data in the stream is empty, end. Otherwise return to Step 2.

Although the above pseudo code is shown for a 32 bit integer data type, the Merge OR operation is not limited to this data type. In one embodiment, other data types may be employed, and as such, the invention is not limited to the integer data type shown herein. In the pseudo-code above, the conditional branching is not employed in step 2, and only one conditional branch is used in step 4 to advance the pointer. Therefore, the number of conditional branches is limited when using VMX instructions. The Merge OR operation should not be limited to a vector register having four data. In one embodiment, the vector register may have a different quantity of data. Accordingly, when one VMX instructions can process P data elements at once, the number of conditional branching is 1/P.

Figure 3:
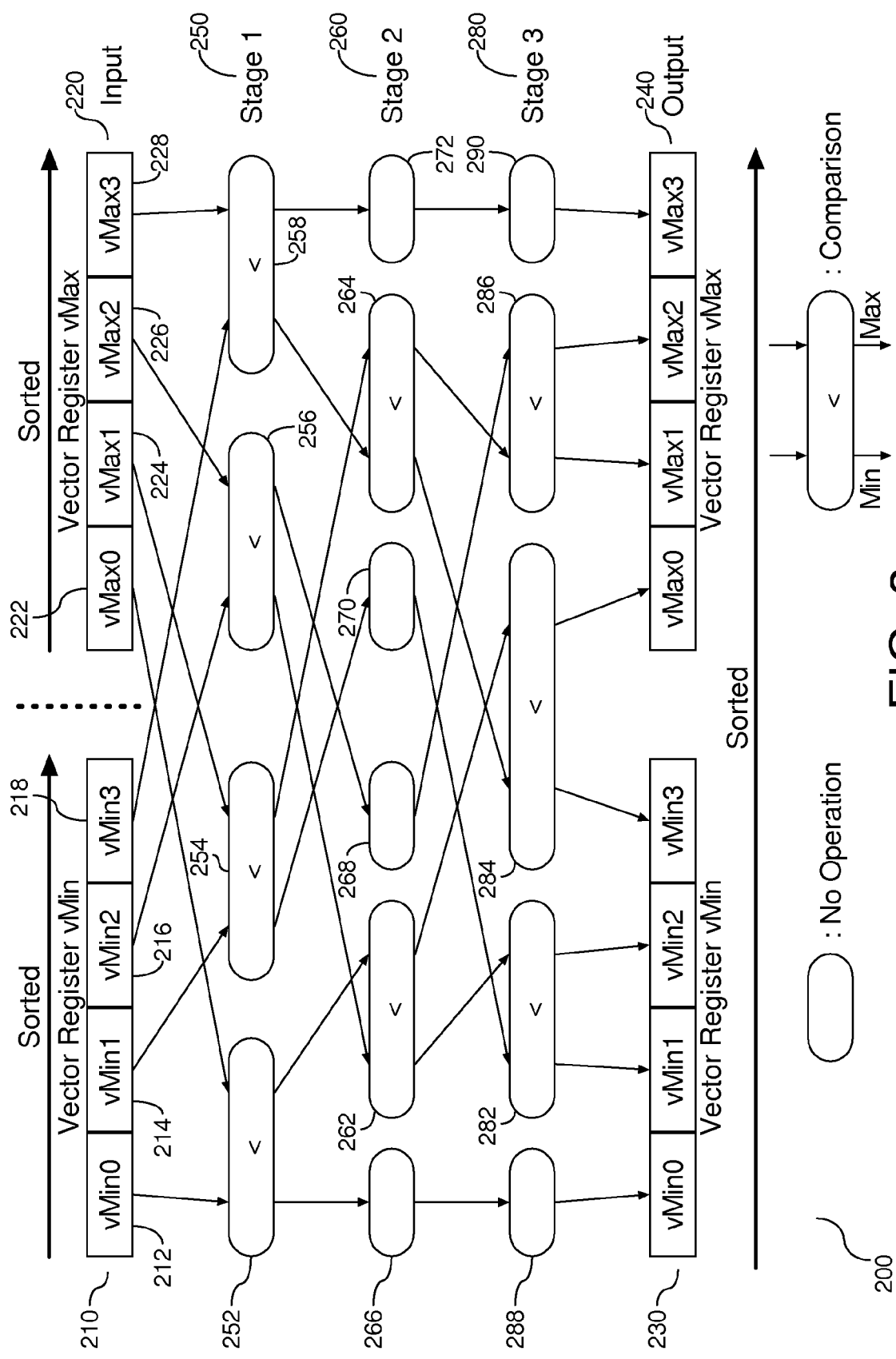
FIG. 3 is a flow diagram illustrating an odd-even merge of two input vector registers using SIMD instructions.

In one embodiment, the merge operation described above in Step 2 employs an odd-even merge method. The odd-even merge sort algorithm is based on a merge algorithm that merges two sorted halves of a sequence to a completely sorted sequence. This algorithm is not data-dependent in that the same number of comparisons is performed regardless of the actual data. The odd-even merge method may be implemented by using the vector minimum (vec_min) and vector maximum (vec_max) instructions, and two vector permute (vec_perm) instructions. The vector permute instructions rearrange data according to an arbitrary order. FIG. 3 is a flow diagram (200) illustrating an odd-even merge of two input vector registers (210) and (220) using VMX instructions. The two input vector registers (210) and (220) form two sorted output registers (230) and (240) through three stages of comparison. At stage$_1$ (250), there are four data comparison operations (252), (254), (256), and (258). More specifically, input register (210) has four data elements, (212), (214), (216), and (218), and input register (220) has four data elements (222), (224), (226), and (228). At stage$_1$ (250), data element (212) is compared with data element (222), data element (214) is compared with data element (224), data element (216) is compared with data element (226), and data element (218) is compared with data element (228). At stage$_2$ (260), there are two data comparison operations (262) and (264) and four elements where no operation takes places (266), (268), (270), and (272). Comparison operation (262) is a comparison sorting the comparison of the data elements from comparisons (252) and (256), and comparison operation (264) is a comparison sorting the comparison of the data elements from comparisons (254) and (258). Similarly, at stage$_3$ (280) there are three data comparisons (282), (284), and (286), and two elements where no operation takes places (288) and (290). Comparison operation (282) is a comparison sorting the comparison (262) with data element (270). Comparison (284) is a comparison sorting the comparison of data elements from comparisons (262) and (264). Comparison (286) is a comparison sorting the comparison of the data elements from comparison (264) with data element (268). Following stage$_3$ (280), the comparison of the two input vector registers (210) and (220) is complete and the sorted data are output into two sorted output registers (230) and (240). Output register (230) contains a sorted vector register which stores the smaller data from the two registers, and the output register (240) contains a sorted vector register which stores the larger data from the two registers. In FIG. 3, the VMX instructions use only two arithmetic comparisons, vector maximum and vector minimum, and two permute instructions to conduct operations in one step without conditional branching. The content of the two input vector registers (210) and (220) can be merged in the operation of log (P)+1 stage, where P is defined as the parallelism of the VMX instruction. For example, where the parallelism is four, the number of stage is log (4)+1, which is three stages.

Figure 4:
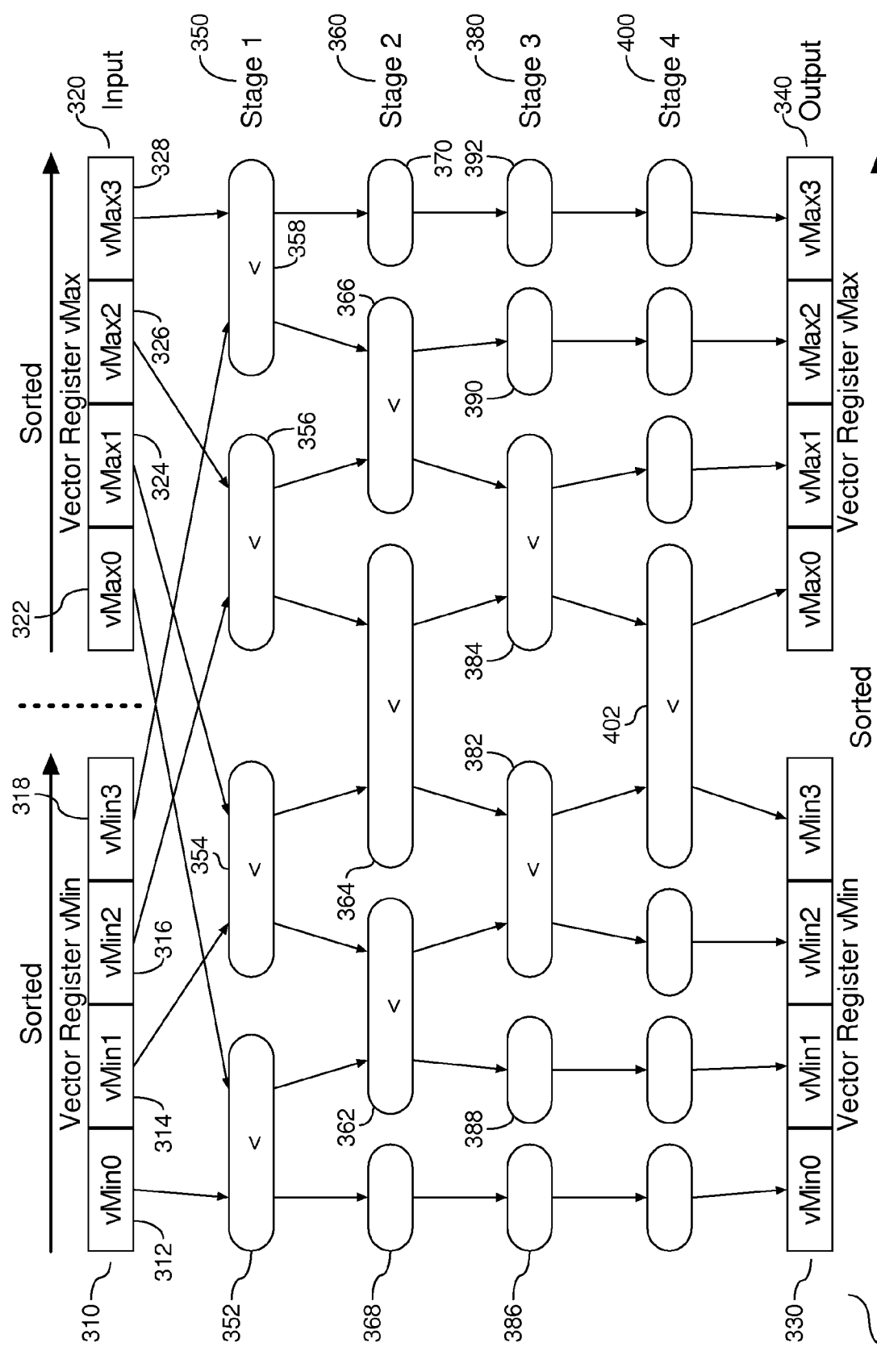
FIG. 4 is a flow diagram illustrating an odd-even merge of two input vector registers using SIMD instructions without a permute instructions.

However, the merge operation of data in the register according to Step 2 in the pseudo code for the Merge OR operation described above should not be limited to the odd-even merge described above. In one embodiment, the two permute instructions may be replaced with a repeat of the rotate, vector minimum and vector maximum instructions. The use of repeated vector minimum and vector maximum instructions mitigates conditional branching. FIG. 4 is a flow diagram (300) illustrating an odd-even merge of two input vector registers (310) and (320) using SIMD instructions without a permute instruction. The two input vector registers (310) and (320) form two sorted output registers (330) and (340) through four stages of comparison. At $stage_1$ (350), there are four data comparison operations (352), (354), (356), and (358). More specifically, input register (310) has four data elements, (312), (314), (316), and (318), and input register (320) has four data elements (322), (324), (326), and (328). At $stage_1$ (350), there are four data comparison operations (352), (354), (356), and (358). At comparison (352) data element (312) is compared with data element (322), at comparison (354) data element (314) is compared with data element (324), at comparison (356) data element (316) is compared with data element (326), and at comparison (358) data element (318) is compared with data element (328). At $stage_2$ (360), there are three data comparison operations (362), (364), and (366), and two elements where no operation takes places (368) and (370). Comparison operation (362) is a comparison sorting the comparison of the data elements from comparisons (352) and (354), comparison operation (364) is a comparison sorting the comparison of the data elements from comparisons (354) and (356), and comparison operation (366) is a comparison sorting the comparison of the data elements from comparisons (356) and (358). Similarly, at $stage_3$ (380) there are two data comparisons (382) and (384), and four elements where no operation takes places (386), (388), (390), and (392). Comparison operation (382) is a comparison sorting the comparison of the data elements from comparisons (362) and (364), and comparison operation (384) is a comparison sorting the comparison of the data elements from comparisons (364) and (366). Following $stage_3$ (380), at $stage_4$ (400), only one comparison operation (402) takes place prior to output of the two sorted output registers (330) and (340). Comparison (402) is a comparison sorting the comparison of data elements from comparisons (382) and (384). Following $stage_4$ (400), the comparison of the two input vector registers (310) and (320) is complete and the sorted data are output into two sorted output registers (330) and (340). Output register (330) contains a sorted vector register which stores the smaller data from the two registers, and the output register (340) contains a sorted vector register which stores the larger data from the two registers. As shown in FIG. 4, the VMX instructions use only two arithmetic comparisons, vector maximum and vector minimum, and one rotate instruction to conduct operations in one step without conditional branching. The content of the two input vector registers (310) and (320) can be merged in the number of stages P, where P is defined as the parallelism of the SIMD instruction.

The invention can take the form of a hardware embodiment, a software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

ADVANTAGES OVER THE PRIOR ART

The implementation of the Merge AND and Merge OR operations using SIMD instructions reduces the number of conditional branch instructions. Mitigation of conditional branch instructions enables a high speed implementation of merge operations. An increase in efficiency and speeding of these merge operation of at least 60% may be achieved using VMX instructions compared with being optimized without the VMX instructions.

ALTERNATIVE EMBODIMENTS

It will be appreciated that, although specific embodiments of the invention have been described herein for purposes of illustration, various modifications may be made without departing from the spirit and scope of the invention. In particular, a different set of procedures may be invoked for the Merge AND operation for a 64 bit integer sequence. The following is an example of alternative pseudo code for a Merge AND operation for two arrays whose elements are a 64 bit integer, using VMX instructions:

1. Load four 64-bit integer values at a time from two input streams.
2. Gather one byte at the least significant byte of each integer value using the vector permutation instruction to make a summary A vector and a summary B vector.
3. Compare the summary A vector with the summary B vector using the vector compare equal instruction as a pair of 16 sets of one-byte data. When there is no pair to correspond proceed to step 7.
4. From two out of four data read from an input stream A and two out of four data read from an input stream B, four bytes of data of each are collected as shown in FIG. 2 to form the summary A and summary B, respectively.
5. Compare the summary A vector and summary B vector as a pair of four sets of four-byte data with the vector compare equal instruction, and, when there is any pair to coincide, compare the data of each element and output the corresponding data.
6. Repeat steps 4 and 5 until the total of each four data read are checked.

7. After advancing the pointer that shows the position to read the next data, return to step 1. After the operation on all the data is complete, end.

Similarly, an alternate set of instructions may be applied to the Merge OR operation wherein the number of comparison operations is reduced by collectively performing omission of overlapped data. Accordingly, the scope of protection of this invention is limited only by the following claims and their equivalents.

We claim:

1. A method for performing a high speed Merge AND operation of two or more data arrays comprising:
   loading a plurality of data from a first input stream into a first hardware vector register;
   loading a plurality of data from a second input stream into a second hardware vector register;
   invoking a single instruction multiple data (SIMD) permute instruction for gathering at least one data item from each input stream and duplicating the gathered data items in a certain order to generate first and second summary data streams, wherein said first summary stream is associated with data from said first input stream and said second summary stream is associated with data from said second input stream;
   invoking a vector compare SIMD instruction to compare said first summary stream with said second summary stream; and
   based upon the vector compare SIMD instruction, comparing a pair of values from the first and second input streams and placing an input value into a single output stream when there is at least one matching pair in a result of said vector compare SIMD instruction.

2. The method of claim 1, wherein the step of invoking a vector compare instruction reduces a quantity of compare instructions for said streams of data.

3. The method of claim 1, wherein the step of invoking a vector compare instruction reduces a quantity of conditional branches in said merge operation.

4. A computer system comprising:
   a single instruction multiple data (SIMD) processor in communication with hardware memory, the SIMD processor configured to employ SIMD instructions to perform high speed merge operations of two or more data arrays, the SIMD processor comprising:
   a plurality of data to be loaded from a first input stream;
   a plurality of data to be loaded from a second input stream;
   a permute instruction to gather a certain part of the data of each input stream and duplicate the gathered data in a certain order to generate first and second summary data streams, wherein said first summary stream is associated with data from said first input stream and said second summary stream is associated with data from said second input stream;
   a vector compare instruction to compare said first summary stream with said second summary stream; and
   based upon the vector compare instruction, a pair of values compared from the first and second input streams and an input value placed into a single output stream, only when there is at least one match pair in a result of said vector compare instruction.

5. The system of claim 4, wherein said vector compare instruction reduces a quantity of compare instructions for said streams of data.

6. The system of claim 4, wherein said vector compare instruction reduces a quantity of conditional branches in said merge operation.

7. A method for performing a high speed Merge AND operation of two or more data arrays comprising:
   loading a plurality of data from a first input stream into a first hardware vector register;
   loading a plurality of data from a second input stream into a second hardware vector register;
   invoking a single instruction multiple data (SIMD) permute instruction to gather at least one data item from each input stream and duplicate the gathered data items in a certain order to generate first and second summary data streams, wherein said first summary stream is associated with data from said first input stream and said second summary stream is associated with data from said second input stream;
   invoking a vector compare SIMD instruction to compare said first summary stream with said second summary stream; and
   comparing a pair of values from the two input streams and placing an input value into a single output stream only when there is at least one matching pair in a result of said vector compare SIMD instruction coinciding with a matching pair of the two input streams.

* * * * *